United States Patent
Maass et al.

(10) Patent No.: US 9,169,572 B2
(45) Date of Patent: Oct. 27, 2015

(54) ENERGY STORAGE AND POWER GENERATION SYSTEM

(75) Inventors: Sebastian Maass, Stuttgart (DE); Stefan Schoenbauer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 873 days.

(21) Appl. No.: 13/024,484

(22) Filed: Feb. 10, 2011

(65) Prior Publication Data
US 2011/0195327 A1    Aug. 11, 2011

(30) Foreign Application Priority Data

Feb. 10, 2010    (DE) .................... 10 2010 001 760

(51) Int. Cl.
| H01M 8/06 | (2006.01) |
| C25B 9/18 | (2006.01) |
| C25B 11/03 | (2006.01) |
| H01M 8/18 | (2006.01) |

(52) U.S. Cl.
CPC . *C25B 9/18* (2013.01); *C25B 11/03* (2013.01); *C25B 11/035* (2013.01); *H01M 8/0656* (2013.01); *H01M 8/186* (2013.01); *Y02E 60/366* (2013.01); *Y02E 60/528* (2013.01)

(58) Field of Classification Search
CPC . H01M 8/0656; H01M 8/0606; H01M 8/186; C25B 9/18; C25B 11/03; C25B 11/035; Y02E 60/366; Y02E 60/528
USPC ........................................................ 429/422
See application file for complete search history.

(56) References Cited

U.S. PATENT DOCUMENTS

| 7,422,816 B2 | 9/2008 | Erdler et al. | |
| 2007/0099062 A1* | 5/2007 | Leonida | 429/38 |
| 2009/0035625 A1* | 2/2009 | Ohkawa | 429/19 |
| 2009/0220845 A1* | 9/2009 | Mittelsteadt et al. | 429/33 |
| 2009/0286115 A1 | 11/2009 | Baumann et al. | |

FOREIGN PATENT DOCUMENTS

| DE | 29823321 U1 | 8/1999 |
| DE | 102007001976 | 7/2008 |
| JP | 2006147371 A * | 6/2006 |
| WO | 2005/008824 A2 | 1/2005 |

OTHER PUBLICATIONS

Machine translation of Yamahi, JP 2006147371 A, Japan, Jun. 2006.*
Ivan Radev, Test of Materials for PEM Fuel Cell and Electrolyzer Using New Easytest Method and Cell, Institute of Electrochemistry and Energy Systems, http://www.bas.bg/cleps/poemes/workshops/Proceedings2/Proceedings/P7_I.Radev.pdf, dated Sep. 16-22, 2005 (4 pages).

* cited by examiner

*Primary Examiner* — Miriam Stagg
*Assistant Examiner* — Brent Thomas
(74) *Attorney, Agent, or Firm* — Michael Best & Friedrich LLP

(57) ABSTRACT

An energy storage and power generation system (10) with at least one fuel cell (40), in which an oxidant and a fuel which can be stored can be converted electrochemically and in the process an electrical current can be generated, and with at least one electrolysis cell (30), which is used for generating the fuel which can be stored for the fuel cell (40), wherein the fuel cell (40) and the electrolysis cell (30) share a common electrode (21), and the fuel cell (40) and the electrolysis cell (30) each use a respective further electrode (31, 41) only for themselves. For this purpose, the invention provides that the fuel can be stored outside the fuel cell (40) and outside the electrolysis cell (30) in a store (13).

20 Claims, 4 Drawing Sheets

ENERGY STORAGE AND POWER GENERATION SYSTEM

BACKGROUND OF THE INVENTION

The invention relates to an energy storage and power generation system with at least one fuel cell, in which an oxidant and a fuel which can be stored can be converted electrochemically and in the process an electrical current can be generated, and with at least one electrolysis cell, which is used for generating the fuel which can be stored for the fuel cell, wherein the fuel cell and the electrolysis cell share a common electrode, and the fuel cell and the electrolysis cell each use a respective further electrode only for themselves.

As a result of an increasing proportion of electrical energy from wind or solar energy, the need to buffer-store energy is increased. A possible solution to this is hydrogen which can be generated by electrolysis in an electrolysis cell in the case of a supply of inexpensive and/or regenerative electrical energy which exceeds demand and which can be used for power generation in the case of a supply of inexpensive and/or regenerative electrical energy which falls below the demand, wherein the hydrogen, as a fuel, reacts electrochemically with an oxidant in a fuel cell.

WO2005/008824 has disclosed an electrochemical system with an electrolysis cell and a fuel cell. In this case, in the electrolysis cell, water and a metal are first converted into oxygen and a metal hydride. The metal hydride is converted, by virtue of a change in temperature, into hydrogen and metal and the former is converted back into water by oxygen in the fuel cell. The electrode at which metal is converted into a metal hydride and back again is used jointly by the electrolysis cell and the fuel cell. In this case, the metal hydride acts as the only store for the hydrogen. One disadvantage with this is that only at most as much hydrogen is available for producing electrical power as there is metal available for reaction to form a metal hydride. In order to be able to store a large quantity of hydrogen, a correspondingly large and therefore heavy electrode needs to be provided which increases the weight and costs of the electrochemical system. In addition, the temperature of the fuel cell needs to be selected such that the metal hydride releases hydrogen. In addition, there is the risk of hydrogen embrittlement.

SUMMARY OF THE INVENTION

The object of the invention is to provide an energy storage and power generation system which avoids the abovementioned disadvantages. In particular, it should be possible to store a large quantity of fuel and at the same time for the electrodes to have a light and/or space-saving design. The intention is for it to be possible for the temperature and the pressure in the fuel cell to be selected independently of hydrogen generation.

The invention provides that the fuel can be stored outside the fuel cell and outside the electrolysis cell in a store. Spatially separating a basic unit of the energy storage and power generation system containing the fuel cell and the electrolysis cell from the store of the energy storage and power generation system increases the degrees of freedom of the energy storage and power generation system according to the invention. Thus, a correspondingly large store can be provided which ensures electrical power production over a long period of time, for example for days or months, without fuel again needing to be generated in the electrolysis. The energy storage and power generation system according to the invention can therefore replace or supplement pumped-storage power plants. It is even possible for the energy storage and power generation system according to the invention to store energy over a period of time which is longer than is conventional at present.

The sufficiently large store also ensures that fuel is available at any time with a desired partial pressure. The basic unit does not need to have a store and can therefore be configured in a space-saving manner. Owing to the fact that large quantities of metal for the store-free electrodes are not required, the weight of the electrodes can be reduced. In this case, the basic unit can additionally be configured and operated in such a way as to correspond in the best possible way to desired temperature and pressure conditions in the fuel cell or to the transport of electrons, ions and reagents. Thus, the temperature and pressure conditions can be matched, for example, to a sensitive polymer-electrolyte membrane, a sensitive catalyst layer or an electrical power requirement without needing to take care to ensure that sufficient fuel is released.

For example, the fuel used can be hydrogen which is stored in molecular form, in particular under pressure, in the store. Caverns can be used as the store. The hydrogen can be stored therein, for example at 80 bar. If already existing natural gas caverns are used as the store, said caverns are already available at low cost.

While the fuel cell is used for electrical power generation and can therefore be considered to be a power generation system, the electrolysis cell together with the store can be considered to be the energy storage system, since the fuel generated in the electrolysis cell by electrical energy can be stored and, if required, electrical energy can be generated again. Therefore, in the electrolysis cell, electrical energy is converted into chemical energy which can be stored and, in the fuel cell, chemical energy is converted into electrical energy. The electrolysis generally always takes place when a supply of regenerative and/or inexpensive electrical energy generation exceeds the demand for electrical energy at the consumers. The fuel cell, on the other hand, is operated when the demand for electrical energy exceeds the energy generation from regenerative and/or inexpensive energy. A reserve in conventional power plants is therefore no longer required.

DE 298 23 321 U1 has disclosed that the fuel cell and the electrolysis cell use both electrodes jointly. One disadvantage here is the fact that a catalyst of a cathode of the fuel cell at which an oxidant, in particular the oxygen, is reduced is insufficiently stable for being used as the catalyst of an anode of the electrolysis cell and for being able to generate the oxidant for the fuel cell. Such a use would result in considerable ageing of the cathode of the fuel cell. Therefore, the invention provides that in total three electrodes are used. For the abovementioned reasons, it is advantageous to form the electrodes at which oxygen is produced or converted, i.e. the cathode of the fuel cell and the anode of the electrolysis cell, in each case separately, with the result that the two oxygen electrodes can each have a different catalyst. The electrode at which hydrogen is produced or converted, on the other hand, can be used as the common electrode jointly by the fuel cell and the electrolysis cell. The common electrode therefore acts as anode of the fuel cell and as cathode of the electrolysis cell. This is possible since this electrode does not prematurely age as a result of the alternate use as anode or cathode. An embodiment in which the cathode of the fuel cell and the anode of the electrolysis cell are separate also enables dynamic operation of the energy storage and power generation system, in which it is possible to change quickly between electrolysis and fuel cell operation. As a result, an electrical buffer store can be dispensed with. The electrolysis cell and the fuel cell can also be operated simultaneously.

The basic unit comprising the electrolysis cell and the fuel cell can be constructed from anode of the electrolysis cell, electrolyte layer of the electrolysis cell, common electrode, electrolyte layer of the fuel cell, cathode of the fuel cell, arranged next to one another in a row. The common electrode has a first side which points towards the anode of the electrolysis cell and a second side which points towards the cathode of the fuel cell. The thickness of the electrolyte layers is preferably less than 100 µm. The electrolyte layers can be acidic or alkaline, with the electrochemical reactions taking place at the electrodes of the basic unit as a function of said acidic or alkaline state, as shown in table 1.

The electrolyte film can be a liquid electrolyte which wets the catalyst layer in the porous common electrode. Alternatively, a solid electrolyte can be used as the electrolyte film. Examples of an acidic, liquid electrolyte film are sulfuric acid or phosphoric acid. An example of an alkaline, liquid electrolyte film is potassium hydroxide. A perfluorinated sulfonic acid membrane or a phosphoric acid-doped polybenzimidazole membrane can be used for an acidic solid electrolyte, and an anion exchanger membrane can be used for an alkaline solid electrolyte. Particularly preferred is the use of an alkaline, liquid electrolyte film. The same electrolyte is preferably used both in the electrolyte film and in the electrolyte layers

TABLE 1

| | Electrolysis cell | | Fuel cell | |
|---|---|---|---|---|
| Electrolyte | Anode | Common electrode (cathode) | Common electrode (anode) | Cathode |
| Acidic | $2H_2O \rightarrow O_2 + 4H^+ + 4e^-$ | $4H^+ + 4e^- \rightarrow 2H_2$ | $2H_2 \rightarrow 4H^+ + 4e^-$ | $O_2 + 4H^+ + 4e^- \rightarrow 2H_2O$ |
| Alkaline | $4OH^- \rightarrow O_2 + 2H_2O + 4e^-$ | $4H_2O + 4e^- \rightarrow 2H_2 + 4OH^-$ | $2H_2 + 4OH^- \rightarrow 4H_2O + 4e^-$ | $O_2 + 2H_2O + 4e^- \rightarrow 4OH^-$ |

At the common electrode, hydrogen which needs to be supplied to a catalyst of the common electrode is consumed during the fuel cell operation, and hydrogen which needs to be discharged by the catalyst is produced during the electrolysis. In the case of an alkaline electrolyte, water needs to be supplied to the catalyst for the electrolysis and water needs to be discharged from the common electrode during fuel cell operation. In order to save on materials and manufacturing costs, it is conceivable that supply and discharge paths in the common fuel cell can be used jointly both in the electrolysis and in the fuel cell operation. For this purpose, provision can be made for the common electrode to have a porous material, for example a foam or a mesh. The porous material contains pores through which the hydrogen can be transported. A region of the common electrode which has the porous material is referred to below as a porous region. The hydrogen can pass through the porous material both from the first side and towards the second side. In this case, catalysts can be arranged on the first and second sides.

Preferably, however, only one catalyst of the common electrode can be used both for the electrolysis and for the fuel cell operation. The catalyst which can be used jointly can be located in the porous regions, in particular distributed over a total length, width and height of the regions. In this case, the porous material, for example a nickel foam, can itself act as catalyst. Alternatively, the catalyst is applied to the porous material. The porous material can be electrically conductive and therefore can perform the function of dissipating the electrical current from the common electrode. For ionic conduction, the catalyst which can be used jointly needs to be in contact with an electrolyte, wherein the electrolyte conducts ions both during the electrolysis and during the fuel cell operation. Therefore, the electrolyte likewise needs to be provided in the porous regions, in particular over the entire length, width and height of the regions. The electrolyte is preferably in the form of a solid or liquid film on the catalyst and will be referred to below as electrolyte film, in order to distinguish it from the electrolyte layers. Therefore, in this preferred embodiment, both jointly usable supply and discharge paths, a jointly usable catalyst and a jointly usable electrolyte film are provided for the fuel cell and the electrolysis cell. In order to be able to completely use the catalyst both in the electrolysis and during fuel cell operation, the thickness of the common electrode is preferably small, in particular less than 50 µm.

which adjoin the first and second sides. In the case of a liquid electrolyte, a gas-impermeable, but ion-permeable layer, for example consisting of Nafion or porous PTFE, can be arranged between the common electrode and the electrolyte layers.

The catalyst layer in the porous material firstly needs to be in contact with the electrolyte, but secondly sufficient hydrogen also needs to pass to the catalyst layer during fuel cell operation. In order to conduct more hydrogen into the porous layer, it may be that the common electrode has channels. The channels can vary in terms of their interface with the porous material. The harder it is for the hydrogen to reach the catalyst in comparison with the ionic conductivity of the electrolyte film, the larger the interface can be.

The channels can extend over the entire width of the common electrode. In order to avoid hydrogen diffusion into the electrolyte layers which adjoin the first and second sides, the channels can have walls which are gas-tight and electrically conductive with respect to the first and second sides and preferably consist of metal. During the production process, the channels can follow, in terms of their physical dimensions, the form of salt bars, which are dissolved at the end of the production process. Alternatively, the channels can be surrounded by the porous material. Two halves of the common electrode with depressions can be used for producing these channels. In this case, the channels result if the two halves are adjoined to one another and the depressions complement one another so as to form the channels surrounded by the porous material. The channels are permeable to the hydrogen towards the porous material. When using a liquid electrolyte film, a gas-permeable, but liquid-impermeable film, for example consisting of PTFE, can be arranged between the channels and the porous material.

The cathode of the fuel cell can be produced from an electrically conductive plate, in which channel-like cutouts for supplying the oxygen to the catalyst layer are located, with said catalyst layer being adjoined by a gas diffusion layer, for example consisting of carbon. Then, there is the catalyst layer which adjoins the electrolyte layer of the fuel cell. The boundary between the electrolyte layer and the catalyst layer is formed by hydrophobization of the catalyst layer or by a separate boundary layer. The anode of the electrolysis cell can have a similar design to the cathode of the fuel cell, wherein the materials listed in table 2 are suitable as catalyst material. Here, Pt/C or IrPt/C means that the platinum or the IrPt is located on a carbon substrate.

TABLE 2

Possible catalyst materials for the electrodes

| Electrolyte is . . . | Anode of the electrolysis cell | Common electrode | Cathode of the fuel cell |
|---|---|---|---|
| Acidic | IrPt/C | Pt/C | Pt/C |
| Alkaline | Ni | Ni | Pt/C or Ag |

If air is supplied as oxygen supplier to the cathode of the fuel cell, the catalyst layer of the cathode of the fuel cell may be contaminated by the $CO_2$ content of the air and therefore may no longer be usable. There is the risk of this happening in particular in the case of a catalyst layer which contains nickel. In order to avoid contamination, the oxygen which is produced at the anode of the electrolysis cell during the electrolysis can be stored, with the result that pure oxygen is available for the fuel cell operation. For this purpose, the energy storage and power generation system according to the invention can have a further store. The water produced during fuel cell operation can also be stored and reused. Owing to the use of pure oxygen instead of air, the efficiency of the fuel cell can also be increased.

In order to increase the electrical voltage or the electrical current during fuel cell operation or hydrogen production during the electrolysis, provision can be made for the energy storage and power generation system according to the invention to have a plurality of fuel cells and/or a plurality of electrolysis cells. In particular, the energy storage and power generation system has the same number of fuel cells and electrolysis cells. The basic units comprising in each case one fuel cell and one electrolysis cell are in this case stacked one above the other.

It is possible for the fuel cells and the electrolysis cells to be stacked alternately one above the other. In this case, the basic units are separated from one another by an electrically insulating and gas-tight layer. The fuel cells can be connected in series or in parallel with one another. The electrolysis cells can also be connected in series or in parallel with one another.

However, as an alternative, it may also be the case that the anode of the electrolysis cell and/or the cathode of the fuel cell has porous material, in a manner similar to the design of the common electrode. For example, a metal foam or an electrically conductive mesh, for example a porous stainless steel structure, can be used. A cathode of the fuel cell with such a configuration can act as cathode of two fuel cells. An anode of the electrolysis cell with such a configuration can be used as anode of two electrolysis cells. For this purpose, common electrodes are arranged on a first lateral face and an opposite second lateral face of the cathode of the fuel cell and the anode of the electrolysis cell, respectively. By virtue of the porous material, oxygen can be supplied to the catalyst layers on both lateral faces in the case of the fuel cell and discharged in the case of the electrolysis cell. Alternatively, a catalyst which is in contact with an electrolyte film can be provided in the porous material. Owing to the fact that, in this embodiment, in each case two fuel cells can share a cathode and two electrolysis cells can share an anode, in each case two fuel cells and two electrolysis cells can be stacked alternately one above the other. The plates of the electrodes and the electrically insulating and gas-tight layer can in this case advantageously be dispensed with, with the result that space is saved and the number of components is reduced.

BRIEF DESCRIPTION OF THE DRAWINGS

Further measures improving the invention are given in the description below relating to the exemplary embodiments of the invention, which is illustrated schematically in the figures. All of the features and/or advantages, including design details, physical arrangement and method steps, which can be gleaned from the claims, the description or the drawing can be essential to the invention both individually and in a wide variety of combinations. In the drawing:

DETAILED DESCRIPTION

Figure 1:
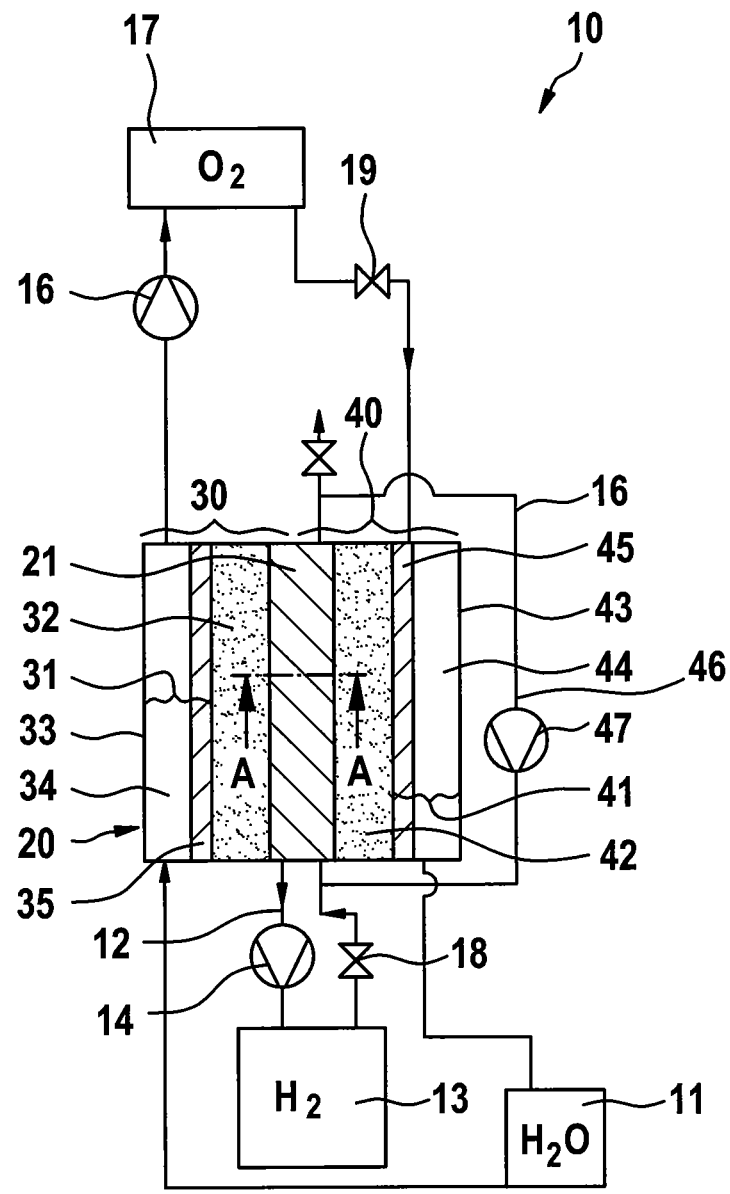
FIG. 1 shows a schematic illustration of an energy storage and power generation system according to the invention.

Elements with the same function and operation have been provided with the same reference symbols in FIGS. 1 to 3.

FIG. 1 shows a schematic illustration of an energy storage and power generation system 10 according to the invention with an exemplary basic unit 20 comprising an electrolysis cell 30 and a fuel cell 40. The electrolysis cell 30 has an anode 31, an electrolyte layer 32 and a cathode, which is in the form of a common electrode 21 and is likewise associated with the fuel cell 40. The common electrode 21 acts as anode in the fuel cell 40, said anode being adjoined by an electrolyte layer 42 and a cathode 41 in the fuel cell 40. In FIG. 1, the electrolyte layers are acidic and solid in the form of a perfluorinated sulfonic acid membrane. If at one instant more electrical energy can be produced inexpensively or regeneratively than the consumers draw, an electrical voltage is applied to the electrolysis cell and water from a water tank 11 is supplied to the anode 31 of the electrolysis cell 30. As indicated in table 1, hydrogen is produced at the common electrode 21 during the electrolysis, and said hydrogen passes into a first store 13 via a hydrogen line 12. In this case, the hydrogen is compressed by a first compressor 14 to 80 bar. Oxygen is produced at the anode 31 of the electrolysis cell 30. The oxygen is compressed in a second compressor 16 and stored in a second store 17. The size ratios are very distorted in FIG. 1. Owing to the fact that the common electrode 21 and the store 13 are separated from one another according to the invention, the basic unit 20 can be very small. The electrolyte layers 32, 42 can have a thickness of less than 100 µm, and the common electrode 21 can have a thickness of less than 50 µm. On the other hand, the stores 13, 17 may be caverns, which can enclose several million cubic meters.

If the electrical energy demand is above the electrical energy which can be generated regeneratively or inexpensively, the operation of the fuel cell 40 is begun. For this purpose, a first valve 18 is opened and hydrogen is supplied to the common electrode 21 from the first store 13. Likewise, a second valve 19 is opened and oxygen is supplied to the cathode 41 of the fuel cell from the second store 17. During fuel cell operation, the fuel cell 40 produces electrical power, which is drawn by a consumer (not illustrated), and water. The water produced at the cathode 41 of the hydrogen cell 40 is stored in the water tank 11. The hydrogen which is not consumed can be supplied back to the common electrode 21 by a third compressor 47 via a recirculation line 16.

The anode 31 of the electrolysis cell 30 has a plate 33, in which at least one cutout 34 for supplying the water and for discharging oxygen is located. The plate 33 is adjoined by a catalyst layer 35, which is adjoined by the electrolyte layer 32. Similarly, a plate 43 of the cathode 41 of the fuel cell 40 has at least one cutout 44. A catalyst layer 45 adjoins the plate 43, and the electrolyte layer 42 adjoins said catalyst layer 45.

Figure 2A:
FIGS. 2A-E show a section through various exemplary embodiments of a common electrode of a basic unit shown in FIG. 1, and FIGS. 3A-C show various stacks according to the invention consisting of basic units.
Figure 2B:
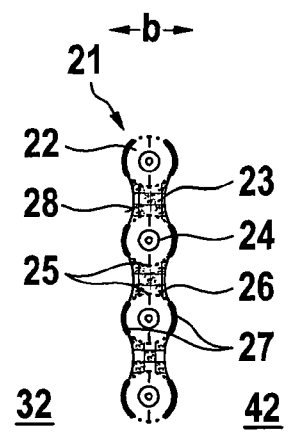
Figure 2C:
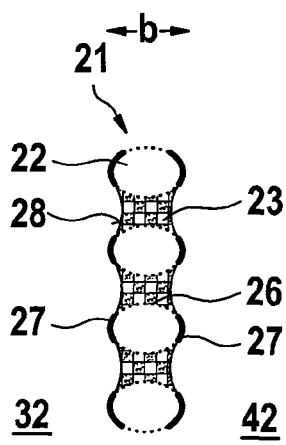
Figure 2D:
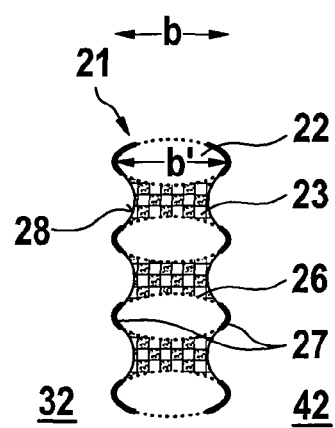

The common electrode 21 has at least one region 23 consisting of porous material consisting of a foamed carbon paste. The carbon paste is coated with platinum as catalyst and with a perfluorinated sulfonic acid membrane as electrolyte film. In order to increase the permeability of the electrolyte film with respect to hydrogen, channels 22 can be provided in the common electrode 21. Five exemplary embodiments of the common electrode 21 are illustrated in FIGS. 2A-E. In this case, a section is positioned along the line A-A shown in FIG. 1. In FIG. 2A, no channel 22 is provided. In FIGS. 2B-E, channels 22 are arranged in the common electrode 21. In FIGS. 2B-D, the channels 22 extend over the entire width b of the common electrode 21. During fuel cell operation, the hydrogen is passed from the first store 13 through the channels 22 as shown by the arrows 24 shown in FIG. 2B. From said channels, the hydrogen passes through a boundary face 26, into the porous regions 23 and permeates through the electrolyte film to the catalyst, as illustrated by the arrows 25 shown in FIG. 2B. In order that the hydrogen remains in the common electrode 21 and does not enter the electrolyte layers 32, 42, the channels 22 have gas-impermeable walls 27 consisting of metal, which delimit the channels 22 with respect to the electrolyte layers 32, 42. The width b of the common electrode 21 and a width b' of the channels 22 increases from FIG. 2B to FIG. 2D. As a result of the increase in the widths b, b', the boundary face 26 through which hydrogen can diffuse into the porous regions 23 increases. As a result, the catalyst is supplied with hydrogen with greater efficiency. The common electrode 21 shown in FIG. 2A is used in the case in which it is sufficient to supply hydrogen to the catalyst even without channels 22. The quantity of hydrogen which can permeate through the electrolyte film without channels 22 would be too low in FIGS. 2B to 2D. From FIG. 2B to FIG. 2D, the quantity of hydrogen which eliminates this deficiency which otherwise increases from FIG. 2B to FIG. 2D increases. In FIG. 2D, a particularly small quantity of hydrogen would permeate through the electrolyte without channels 22.

In order to produce the common electrode 21 shown in FIGS. 2B-D, the channels 22 can follow, in terms of their physical dimensions, the form of a salt bar. Then, a C paste is foamed between the salt bars, the resultant porous material is coated with platinum as catalyst and with the solid electrolyte and the salt bars are surrounded on the outside by a metal in the form of walls 27. Then, the salt is dissolved and the channels 22 are thus produced.

Figure 2E:
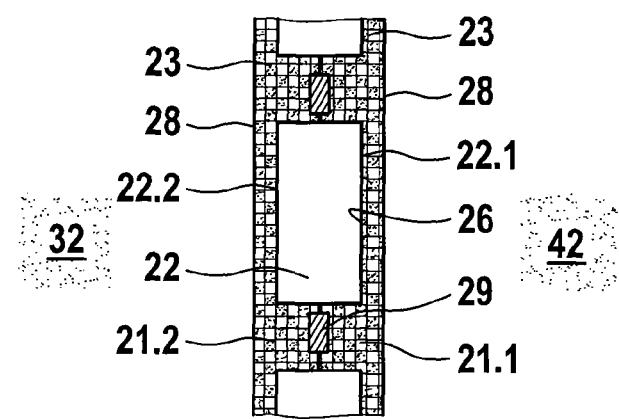

FIG. 2E illustrates a section through a further alternative of a common electrode 21, in which the channels 22 are located only in the interior of the porous region 23. Metallic conductors 5 are provided so as to improve electrical conductivity. The common electrode 21 shown in FIG. 2E can be manufactured by assembling two halves 21.1, 21.2. The halves 21.1, 21.2 have carbon foam which is coated with a platinum catalyst and the solid electrolyte. Depressions 22.1, 22.2 are provided in the two halves 21.1, 21.2, and these depressions result in the channels 22 when the two halves are assembled. The boundary area 26 can be matched in terms of its size so as to correspond to the desired hydrogen permeation.

If a liquid electrolyte is used instead of the solid electrolyte, the boundary areas 26 in FIGS. 2B-D have a gas-permeable, but liquid-impermeable film. The boundary 28 between the porous regions 23 and the adjoining electrolyte layers 32, 42 is in this case a gas-impermeable, but ion-permeable layer, for example coated using screen printing, in order to prevent diffusion of the hydrogen into the electrolyte layers 32, 42, but to enable ion conduction. There is no coating of the porous material with the solid electrolyte.

Figure 3A:
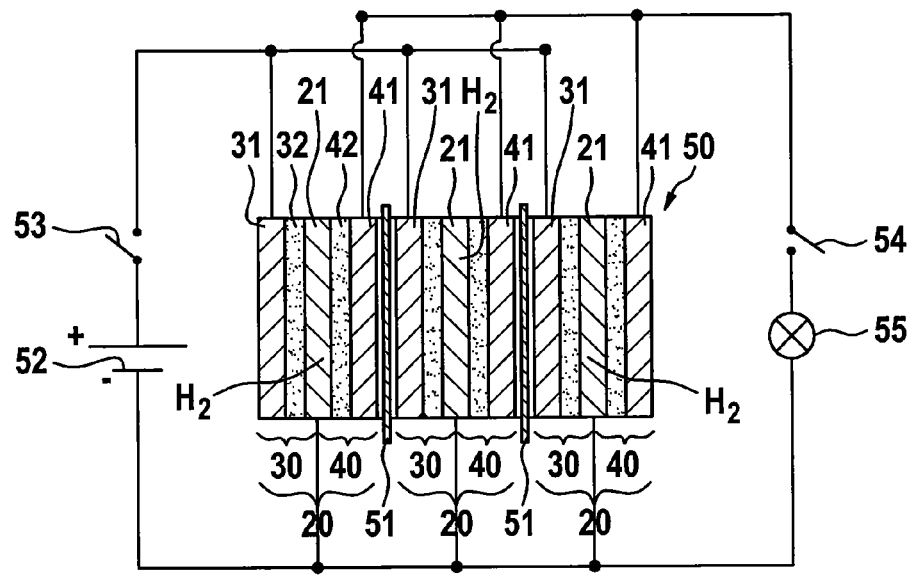
Figure 3B:
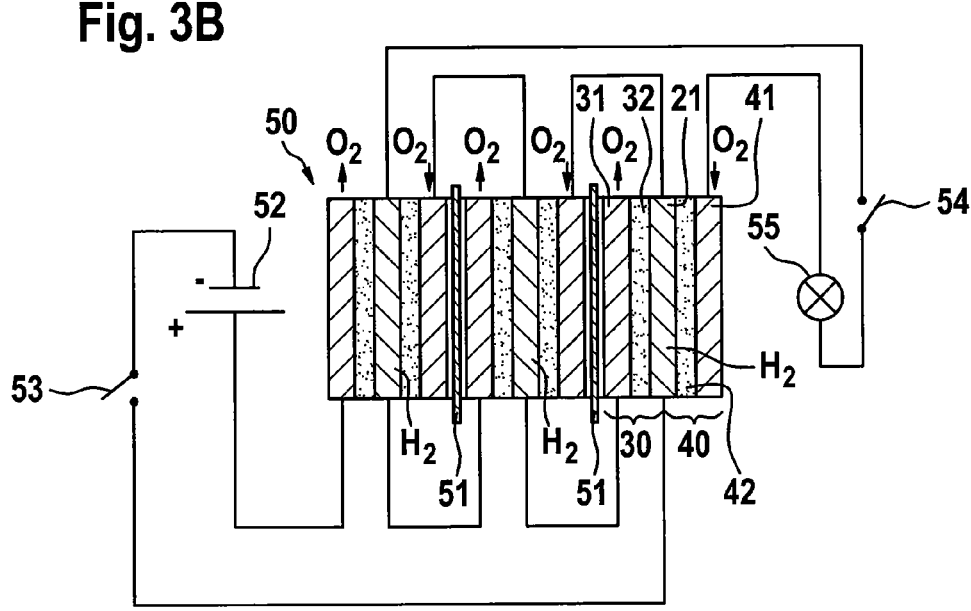
Figure 3C:
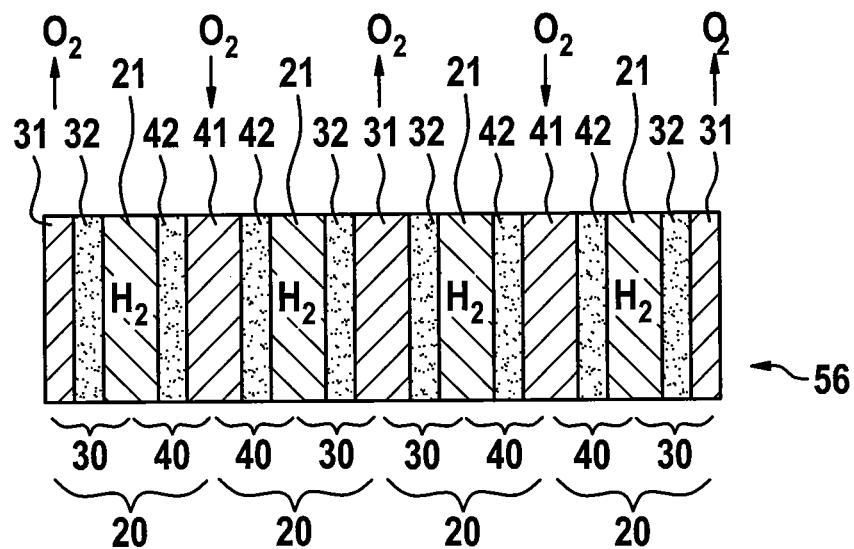
Figure 3C:
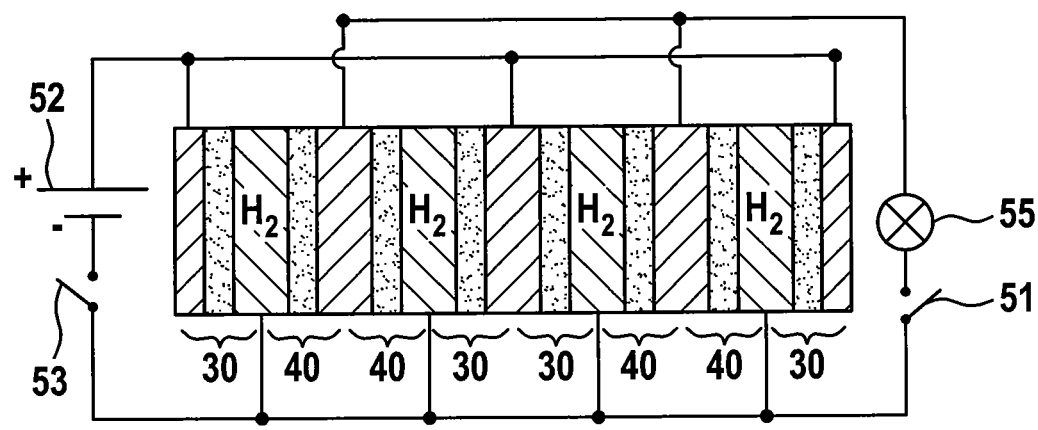

FIGS. 3A to 3C illustrate various exemplary embodiments of stacks 50 of basic units 20. FIGS. 3A and 3B each illustrate the same stack 50. The anode 31 of the electrolysis cell 30 and the cathode 41 of the fuel cell 40 shown in FIG. 1 have in this case been summarized schematically as one unit. The basic units 20 are each stacked one above the other in the same direction and separated by an electrically insulating layer 51 in FIGS. 3A and 3B. This results in a stack sequence in which in each case one electrolysis cell 30 and one fuel cell 40 alternate. The electrodes 21, 31 of the electrolysis cell 30 are connected electrically in parallel with an electrical voltage source 52 in FIG. 3A, wherein the voltage of the voltage source 52 can be applied to the electrolysis cells 30 by a switch 53 being closed. Likewise, the fuel cells 40 are connected electrically in parallel with one another. By virtue of a switch 54, the fuel cell 40 can be connected to a consumer 55. FIG. 3B differs from FIG. 3A merely in that the electrolysis cells 30 are connected in series with one another and the fuel cells 40 are also connected in series with one another.

In FIG. 3C, the anode 31 of the electrolysis cell 30 and the cathode 41 of the fuel cell 40 are formed from a porous carbon foam with a metal catalyst, in which an electrolyte film is also located. As a result, the anode 31 of the electrolysis cell 30 or the cathode 41 of the fuel cell 40 can be formed by two common electrodes 21 which are arranged to the right and left thereof, two electrolysis cells 30 and two fuel cells 40, respectively. The anode 31 of the electrolysis cell 30 formed in this way therefore belongs to in each case two electrolysis cells 30. The cathode 41 of the fuel cell 40 thus formed in each case belongs to two fuel cells 40. A stack 56 with anodes 31 of the electrolysis cells 30 and cathodes 41 of the fuel cells 40 formed in this way has a stack sequence in which alternately two electrolysis cells 30 and two fuel cells 40 are stacked one above the other alternately, apart from the ends of the stack 56. In such a stack 56, in each case one basic unit 20 in which the electrolysis cell 30 is arranged to the left of the fuel cell 40 alternates with a basic unit 20 in which the electrolysis cell 30 is arranged to the left of the fuel cell 40. FIG. 3C illustrates the same stack 56 twice, wherein the stack sequence is explained in more detail in the illustration at the top, while the electrical wiring of the stack 56 is illustrated in the illustration at the bottom. In this case, both the electrolysis cells 30 and the fuel cells 40 are each connected electrically in parallel with one another.

What is claimed is:

1. An energy storage and power generation system (10) comprising:
   at least one fuel cell (40), in which an oxidant and a fuel which can be stored can be converted electrochemically and in the process an electrical current can be generated;
   at least one electrolysis cell (30), which is used for generating the fuel which can be stored for the fuel cell (40), wherein the fuel cell (40) and the electrolysis cell (30) share a common electrode (21), and the fuel cell (40) and the electrolysis cell (30) each use a respective further electrode (31, 41) only for themselves; and
   a store (13) for storing the fuel, the store located outside the fuel cell (40) and outside the electrolysis cell,
   wherein the common electrode (21) has both an open channel (22) and a separate porous region (23) adjacent the open channel (23), wherein the open channel (22) extends along a first direction to direct hydrogen from the store (13) along the first direction, wherein the porous region (23) is positioned to receive the hydrogen from the open channel (22) along a second direction that is perpendicular to the first direction, and to direct the hydrogen along a third direction that is perpendicular to both the first direction and the second direction.

2. An energy storage and power generation system (10) according to claim 1, characterized in that the common electrode (21) acts as anode of the fuel cell (40) and as cathode of the electrolysis cell (30) with the result that the fuel can be formed at the common electrode (21) in the electrolysis cell (30) and can be converted at the common electrode (21) in the fuel cell (40).

3. An energy storage and power generation system (10) according to claim 1, characterized in that the common electrode (21) has a porous material.

4. An energy storage and power generation system (10) according to claim 3, characterized in that the porous region (23) of the common electrode (21) includes porous material and has a catalyst adjoined by an electrolyte film, wherein the catalyst and the electrolyte film can be used both for fuel generation and for electrical power generation.

5. An energy storage and power generation system (10) according to claim 4, characterized in that the electrolyte film is acidic or alkaline and is in the form of a liquid or solid electrolyte.

6. An energy storage and power generation system (10) according to claim 1, characterized in that the fuel is hydrogen, which can be stored in molecular form.

7. An energy storage and power generation system (10) according to claim 1, characterized in that the oxidant required in the fuel cell (40) can be generated in the electrolysis cell (30) during operation of the electrolysis cell (30), the system comprising a further second store (17) for storing the oxidant and supplying the oxidant to the fuel cell (40) during operation of the fuel cell (40).

8. An energy storage and power generation system (10) according to claim 1, characterized in that a plurality of fuel cells (40) and just as many electrolysis cells (30) are stacked one above the other.

9. An energy storage and power generation system (10) according to claim 8, characterized in that in each case two fuel cells (40) and two electrolysis cells (30) are stacked alternately one above the other.

10. An energy storage and power generation system (10) according to claim 1, characterized in that the fuel is hydrogen, which can be stored in molecular form, under pressure.

11. An energy storage and power generation system (10) according to claim 1, characterized in that a plurality of fuel cells (40) and just as many electrolysis cells (30) are stacked one above the other, wherein the fuel cells (40) and the electrolysis cells (30) are connected electrically in series or in parallel.

12. An energy storage and power generation system (10) according to claim 11, characterized in that in each case two fuel cells (40) and two electrolysis cells (30) are stacked alternately one above the other.

13. An energy storage and power generation system (10) according to claim 2, characterized in that the common electrode (21) has a porous material.

14. An energy storage and power generation system (10) according claim 13, characterized in that the porous region (23) of the common electrode (21) includes porous material and has a catalyst adjoined by an electrolyte film, wherein the catalyst and the electrolyte film can be used both for fuel generation and for electrical power generation.

15. An energy storage and power generation system (10) according to claim 1, characterized in that the electrolyte film is acidic or alkaline and is in the form of a liquid or solid electrolyte.

16. An energy storage and power generation system (10) according to claim 15, characterized in that the fuel is hydrogen, which can be stored in molecular form.

17. An energy storage and power generation system (10) according to claim 16, characterized in that the oxidant required in the fuel cell (40) can be generated in the electrolysis cell (30) during operation of the electrolysis cell (30), the system comprising a further second store (17) for storing the oxidant and supplying the oxidant to the fuel cell (40) during operation of the fuel cell (40).

18. An energy storage and power generation system (10) according to claim 1, characterized in that both lateral sides of the common electrode (21) include an electrolyte film.

19. An energy storage and power generation system (10) according to claim 1, wherein the open channel (22) is defined in part by gas-impermeable walls (27) on opposing sides of the open channel (22), each of the walls (27) extending along the first direction to prevent hydrogen from passing along the third direction while the hydrogen is inside the open channel (22).

20. An energy storage and power generation system (10) according to claim 1, wherein the common electrode (21) includes a plurality of open channels (22) and porous regions (23).

* * * * *